United States Patent Office 3,363,401
Patented Jan. 16, 1968

3,363,401
PROCESS FOR THE RECOVERY OF GASEOUS SULPHURIC COMPOUNDS PRESENT IN SMALL QUANTITIES IN RESIDUAL GASES
René Jean-Pierre, Louveciennes, Jean Solinhac, Amou, Georges Molinet, Bernadets, and René Terminet, Moureux, France, assignors to Societe anonyme dite: Societe Nationale des Petroles d'Aquitaine, Paris, France, a French company
No Drawing. Filed Jan. 6, 1965, Ser. No. 423,824
Claims priority, application France, Jan. 7, 1964, 959,497; May 22, 1964, 975,522
4 Claims. (Cl. 55—73)

This invention relates to the recovery of vesicular sulfur and gaseous sulfur compounds present in small quantities in residual gases.

It is well known that sulfur producing plants allow some of the sulfur, in the form of sulfuric compounds or vesicular sulfur, to escape as part of the residual gases leaving the chimneys, or smokestacks, which assure the dispersion into the atmosphere of these gases after combustion in an incinerator. The normal composition of such residual gases is approximately:

| | | |
|---|---|---|
| $N_2$ | percent | 54 |
| $H_2O$ | do | 29 |
| $CO_2$ | do | 16 |
| $H_2S$ | do | 0.6 |
| $SO_2$ | do | 0.4 |
| S (vesicular) | grams/meter³ | 6 |

It would be desirable to desulfurize these gases for two principal reasons:
(1) Air pollution would be reduced; and
(2) The lost sulfur could be recovered.

The presently-known processes for desulfurizing such residual gases, wherein the sulfur compounds are present in small concentrations, do not permit the realization of industrially profitable filtering and recovery operations, either because they utilize or consume costly absorbing or reaction substances, or because they lead to the recovery of products which are useless or of little commercial value.

It is therefore an object of the present invention to achieve a process which does not have the above-noted defects and which permits: the treatment of residual gases having small concentrations of sulfur compounds (of the order of 5% or less, by volume); the utilization of a reusable adsorbent not subject to loss or deterioration; the use of a relatively small quantity of energy; the recovery of the sulfur compounds, either in their original state or in a state resulting from a reaction; the obtaining of sulfur compounds in concentrations distinctly higher than their concentrations in the gases prior to treatment and therefore a varied and profitable utilization thereof; the total elimination of vesicular sulfur from the residual gases; the realization of an inexpensive and effective reduction in pollution; and the elimination of the need for complicated or expensive installations or expensive treatment materials.

The process according to the present invention is carried out in two steps:

First, an adsorption step wherein the residual gases are passed through an adsorbing mass, at a temperature which is preferably between the ambient temperature and around 150° C., this temperature in any event always being less than the temperature existing for the second step; and secondly a desorption-regeneration step wherein the adsorbed sulfur compounds are desorbed and the adsorbing mass is simultaneously regenerated by heating, combustion or displacement by means of hot gases or superheated steam, at a temperature equal to or greater than around 150° C.

The adsorbing mass may be made of mineral adsorbents chosen from the class comprising mixtures or combinations of silica or alumina.

The adsorption and desorption can be carried out according to the stationary-bed technique, the movable-bed technique, the fluidized-bed technique, or similar techniques and with parallel currents or back-currents.

The coarseness of the adsorbent used depends essentially on the permissible load loss in the installation considered and/or on the specific technique employed.

The physical and chemical characteristics of the adsorbent are chosen in accordance with the nature of the compounds to be adsorbed and/or the products to be obtained by the regeneration, and as a function of the efficiency desired.

The quantity of adsorbent is calculated so that the weight of the product or products adsorbed in relation to the weight of adsorbent does not exceed the threshold established for the desired efficiency.

This invention may be more clearly understood by reference to specific examples to be given below. In these examples, the techniques utilized were the movable bed technique and the parallel current and back current techniques for the adsorption as well as for the desorption and regeneration. For this purpose, the residual gases are injected into an adsorber through an adsorbing bed. The overall result produced comprises an adsorption of the $H_2S$, $SO_2$ and the vesicular S components and of the sulfur produced by the reciprocal chemical reaction taking place between the $H_2S$ and the $SO_2$, in such a way that the adsorbing bed is the seat of a catalytic chemical reaction and an adsorption.

The loaded adsorbing mass, or catalyzer, is lowered by simple gravity into a second apparatus, called a regenerator, where it is heated to a sufficiently high temperature, in the presence of an excess of air, to desorb and burn the sulfur which it contains.

After having been regenerated, the catalyzer is cooled and returned to a reservoir from which the adsorber is recharged.

*Example 1.*—Treatment of residual gas containing both $SO_2$ and $H_2S$.

Gas containing both $SO_2$ and $H_2S$ is treated by utilizing, as an adsorbent, a synthetic zeolite in the form of cylindrical granules around 3 mm. in diameter and 3 to 6 mm. in length. The apparent specific gravity of the mass is around 0.7. The diameters of its pores are around 5 A. The molar ratio of $SiO_2/Al_2O_3$ is of the order of 0.1. The operating conditions are:

*Adsorption*

| | |
|---|---|
| Flow rate of residual gas, m.³ (at S.T.P.)/hour | 1000 |
| Concentration of $H_2S$ percent by volume | 0.6–0.8 |

| | | |
|---|---|---|
| Concentration of $SO_2$ | do | 0.5–0.7 |
| Gas temperature at the inlet | ° C | 120–140 |
| Total volume of adsorbent | liters | 400 |
| Flow rate of adsorbent | liters/hour | 200 |
| Adsorbent temperature at the time of this introduction | ° C | 100–120 |

There is also present vesicular sulfur which, in its pure non-combined state, is carried along by the residual gas and which is present in a concentration of 6 grams/meter$^3$.

Regeneration

The regeneration is achieved by the combustion of the sulfur contained in the adsorbent by the blowing of hot air at 280–300° C. at a flow rate of 60 m.$^3$ (at S.T.P.)/ hour across 120 liters of adsorbent. The quantity of adsorbent to be regenerated was 200 liters/hour.

The filtering measured efficiency was of the order of 85–88%. The regeneration was quantitative; i.e., no sulfur compounds were left in the zeolite.

100% of the sulfur present in the vapor state and in the vesicular state in the residual gases was recovered.

*Example 2.*—Treatment of residual gases containing $H_2S$ alone.

Under the same operating conditions as Example 1, an adsorbent consisting of spheres of around 3.5 mm. diameter, formed of a mixture of alumina and activated silica was used, the weight ratio of $SiO_2/Al_2O_3$ being 0.97.

The specific area of the adsorbent was 650 m.$^2$/gram, the average diameter of its pores was 20 A., and its apparent density was 0.8 kg./decameter$^2$.

The following operating conditions were imposed:

Adsorption

| | |
|---|---|
| Residual gas flow rate ____m.$^3$ (at S.T.P.)/hour | 1000 |
| Concentration of $H_2S$ ____percent | 0.8 |
| Density of vesicular sulfur ____grams/m.$^3$ | 5–7 |
| Residual gas temperature ____° C | 130 |
| Supply of adsorbent ____liters/hour | 200 |
| Total volume of adsorbent ____liters | 400 |

Regeneration

| | |
|---|---|
| Hot air flow rate, m.$^3$ (at S.T.P.)/hr. at 300° C | 65 |
| Supply of adsorbent to be regenerated ____liters/hour | 200 |

The following results were obtained:

| | |
|---|---|
| Efficiency of adsorption ____percent app | 85–88 |
| Efficiency of regeneration ____do | 100 |

100% pf. the vesicular sulfur contained in the residual gases was recovered.

*Example 3.*—Treatment of residual gases containing $SO_2$ alone.

Using the same procedure as for Example 1, adsorbent spheres of zeolite, sold under the commercial name of Eva Sorbon (sodium aluminosilicate manufactured by the Walco Company) were used and the following operating conditions were employed:

Adsorption

| | |
|---|---|
| Residual gas flow rate | 400 m.$^3$ (at S.T.P.)/hour. |
| Concentration of $SO_2$ | 0.6–2.5 percent. |
| Quantity of vesicular sulfur | 6 grams/m.$^3$. |
| Residual gas temperature | Ambient to 200 percent. |
| Supply of adsorbent | 200 liters/hour. |
| Total volume of adsorbent | 400 liters. |

Regeneration

| | |
|---|---|
| Hot air flow rate | 35 m.$^3$ (at S.T.P.)/hour at 200° C. |
| Supply of adsorbent to be recuperated | 200 liters/hour. |

The following results were obtained:

| | Percent |
|---|---|
| Efficiency of adsorption | 97 |
| Efficiency of regeneration | 100 |

100% of the vesicular sulfur was recovered.

It was noted that the adsorption efficiency remained around 97% even when the concentration of sulfur deposited on the adsorbent reached 24–5% and that this efficiency was still around 85–88% after some ten adsorption-regeneration cycles.

By way of comparison, when alumina alone was used as the adsorbent a marked loss of activity was noted, regardless of the type of alumina used, when the concentration of sulfur deposited on the adsorbent reached 2% by weight and the adsorption efficiency dropped to 35% after some ten adsorption-regeneration cycles.

The examples given above clearly show that the process of the present invention may be applied to the treatment of all residual gases having small sulfur compound concentrations in order to recover these compounds either for economic reasons or to reduce the air pollution normally created by, for example, the furnaces of cement plants, industrial plants, central heating plants, sulfur factories utilizing the Claus process, petroleum refining furnaces, coke furnaces, etc.

The process of the present invention is of particular value in the treatment of industrial exhaust gases containing any of the various sulfur compounds, so as to permit these compounds to be removed from these gases and to be reconcentrated, thus rendering these compounds commercially exploitable for other purposes, without being limited by the presence of oxygen or other gases. Thus, for example, in the treatment of the waste products of a power central which consumes heavy fuels with the waste gases containing between 0.08 and 0.15%, sulfur anhydride, it was possible to trap 80% of the $SO_2$ and, by means of a desorption by external heating at 350–400° C., to obtain a gas having an $SO_2$ concentration of 28–35%, representing a reconcentration ratio of greater than 200:1.

While several embodiments and applications of the present invention have been described in detail herein, it should be appreciated that many variations and modifications may be made without departing from the spirit of this invention, whose coverage should therefore be limited only by the scope of the attached claims.

We claim:

1. A process for the removal of vesicular sulfur and gaseous sulfur compounds from residual gases containing at most 5% by volume of a mixture of the vesicular sulfur with a gaseous sulfur compound selected from the group consisting of $H_2S$, $SO_2$ and mixtures thereof which comprises:
    (a) contacting, at a temperature ranging from room temperature to 150° C., the sulfur containing residual gas with an adsorbent material selected from the group consisting of a mixture of activated silica and alumina and zeolites having a pore size of at least 5 angstroms, for a time sufficient for the adsorbent material to adsorb and to thereby substantially remove the vesicular sulfur and the sulfur containing compounds from the residual gas; and
    (b) heating the adsorbent material at a temperature of at least 150° C. in the presence of an excess of air so as to simultaneously desorb the sulfur compounds and the vesicular sulfur adsorbed thereon in the form of $SO_2$ and regenerate the adsorbent material.

2. A process as recited in claim 1, wherein said regeneration is carried out by combustion using hot air.

3. A method according to claim 1 wherein the adsorbent material is a mixture of silica and alumina which contains a molar ratio of $SiO_2$ to $Al_2O_3$ in the order of 0.1.

4. A method according to claim 1 wherein the residual gas contains vesicular sulfur in combination with a gaseous mixture of $H_2S$ and $SO_2$, and said vesicular sulfur is present in a concentration of approximately 6 grams/meter$^3$ and the concentration of $H_2S$ is from about 0.6 to about 0.8% by volume and the concentration of $SO_2$ is from about 0.5 to about 0.7% by volume.

References Cited

UNITED STATES PATENTS

| | | | |
|---|---|---|---|
| 1,145,579 | 7/1915 | Garner | 55—73 X |
| 1,335,348 | 3/1920 | Patrick et al. | 55—73 |
| 1,577,534 | 3/1926 | Miller | 55—73 X |
| 2,780,310 | 2/1957 | Schaub | 55—73 |
| 3,078,640 | 2/1963 | Milton | 55—73 |
| 2,992,065 | 7/1961 | Feustel et al. | 23—178 X |
| 3,154,383 | 10/1964 | Froning et al. | 23—225 |
| 3,284,158 | 11/1966 | Johswich | 23—178 |

SAMIH N. ZAHARNA, *Primary Examiner.*

REUBEN FRIEDMAN, *Examiner.*

J. W. ADEE, *Assistant Examiner.*